(12) United States Patent
Han et al.

(10) Patent No.: US 9,503,286 B2
(45) Date of Patent: Nov. 22, 2016

(54) METHOD OF TRANSMITTING AND RECEIVING CHANNEL INFORMATION IN MULTI-HOP NETWORK AND TERMINALS THEREFOR

(71) Applicant: SAMSUNG ELECTRONICS CO., LTD., Suwon-si (KR)

(72) Inventors: Kwang Hoon Han, Suwon-si (KR); Kyung Hun Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 279 days.

(21) Appl. No.: 13/967,869

(22) Filed: Aug. 15, 2013

(65) Prior Publication Data

US 2014/0146757 A1  May 29, 2014

(30) Foreign Application Priority Data

Nov. 26, 2012 (KR) .................. 10-2012-0134451

(51) Int. Cl.
*H04L 25/00* (2006.01)
*H04L 25/02* (2006.01)
*H04L 5/00* (2006.01)

(52) U.S. Cl.
CPC ......... *H04L 25/0224* (2013.01); *H04L 5/0048* (2013.01)

(58) Field of Classification Search
None
See application file for complete search history.

(56) References Cited

U.S. PATENT DOCUMENTS

| 8,514,913 | B2* | 8/2013 | Heath et al. ............. 375/214 |
| 2003/0076799 | A1* | 4/2003 | Kwak et al. ............. 370/335 |
| 2003/0129989 | A1* | 7/2003 | Gholmieh et al. ......... 455/452 |
| 2003/0185159 | A1* | 10/2003 | Seo et al. ............... 370/278 |
| 2006/0215597 | A1* | 9/2006 | Dominique et al. ........ 370/328 |
| 2007/0015461 | A1* | 1/2007 | Park et al. ............. 455/13.1 |
| 2007/0058584 | A1* | 3/2007 | Sutskover .............. 370/330 |
| 2007/0190934 | A1 | 8/2007 | Kim et al. |
| 2007/0201400 | A1 | 8/2007 | Kang et al. |
| 2008/0137581 | A1 | 6/2008 | Doppler et al. |

(Continued)

FOREIGN PATENT DOCUMENTS

KR  10-2008-0028264 A  3/2008
KR  10-2010-0007764 A  1/2010

(Continued)

OTHER PUBLICATIONS

International Search Report issued Sep. 26, 2013 in counterpart International Application No. PCT/KR2013/005976.

*Primary Examiner* — Hassan Phillips
*Assistant Examiner* — Gautam Sharma
(74) *Attorney, Agent, or Firm* — NSIP Law

(57) ABSTRACT

Provided is a method and a terminal for a multi-hop network. The method includes determining whether channel information is necessary to transmit data processed based on a transmission scheme used in the multi-hop network and outputting a result indicative thereof. The method includes configuring channel information based on the transmission scheme, based on the result. The method further includes transmitting the configured channel information and the data processed using the configured channel information.

10 Claims, 12 Drawing Sheets

(56) References Cited

U.S. PATENT DOCUMENTS

| | | | |
|---|---|---|---|
| 2008/0227386 A1 | 9/2008 | Dayal et al. | |
| 2008/0274692 A1 | 11/2008 | Larsson | |
| 2009/0135772 A1* | 5/2009 | Kwon et al. | 370/329 |
| 2009/0181693 A1 | 7/2009 | So et al. | |
| 2010/0157826 A1* | 6/2010 | Yu et al. | 370/252 |
| 2012/0094682 A1* | 4/2012 | Ode et al. | 455/452.1 |
| 2012/0230255 A1* | 9/2012 | Li et al. | 370/328 |
| 2013/0028171 A1* | 1/2013 | Sharifian et al. | 370/315 |
| 2013/0208654 A1* | 8/2013 | Fujii et al. | 370/315 |
| 2013/0225166 A1* | 8/2013 | Akhtar et al. | 455/435.1 |

FOREIGN PATENT DOCUMENTS

| | | |
|---|---|---|
| KR | 10-2011-0041386 A | 4/2011 |
| KR | 10-1041639 B1 | 6/2011 |
| KR | 10-2011-0082075 A | 7/2011 |
| KR | 10-2012-0000540 A | 1/2012 |

* cited by examiner

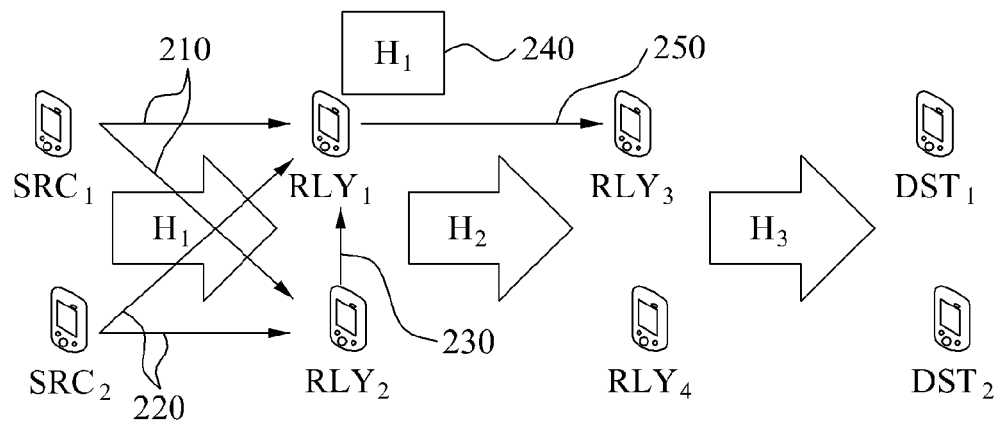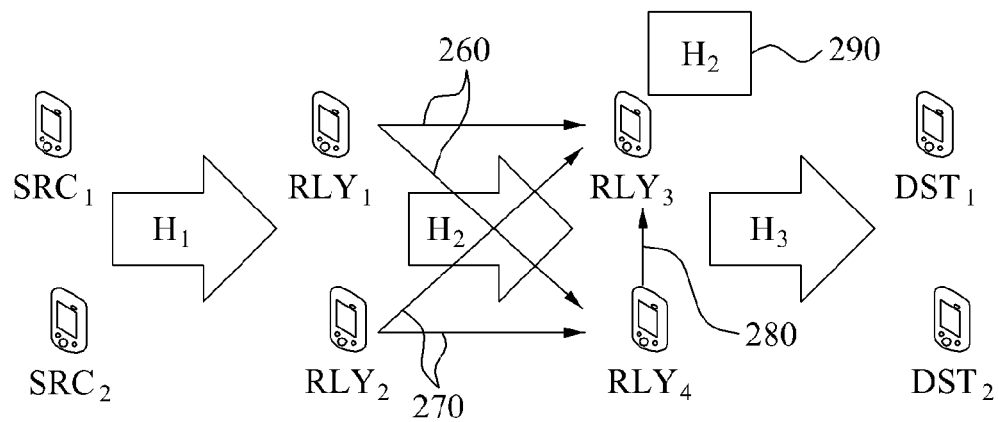
FIG. 2

FIG. 3
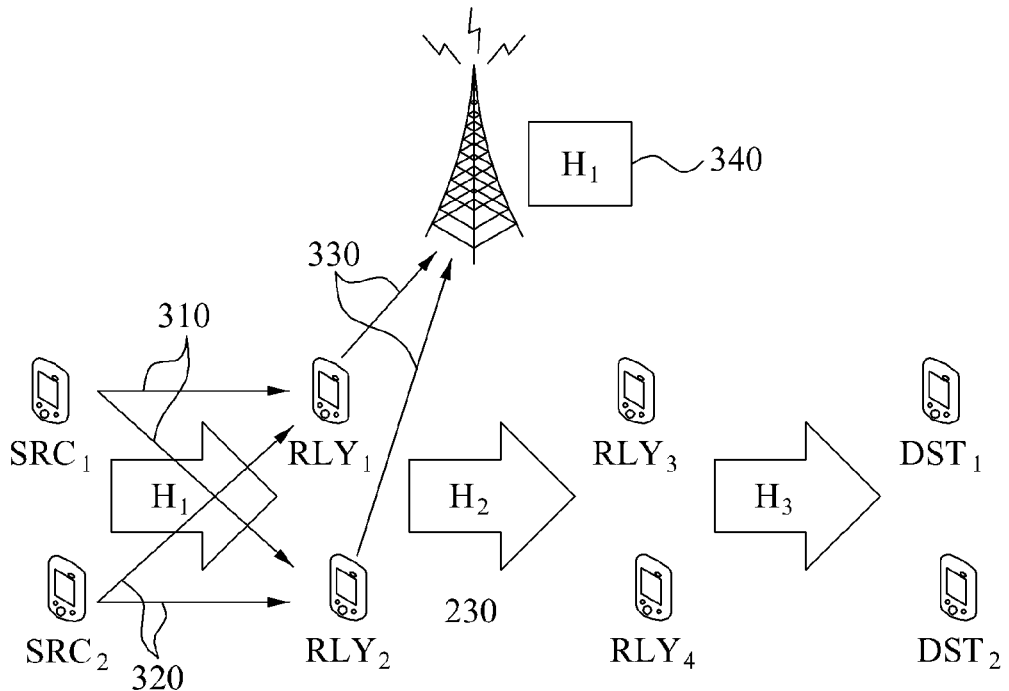
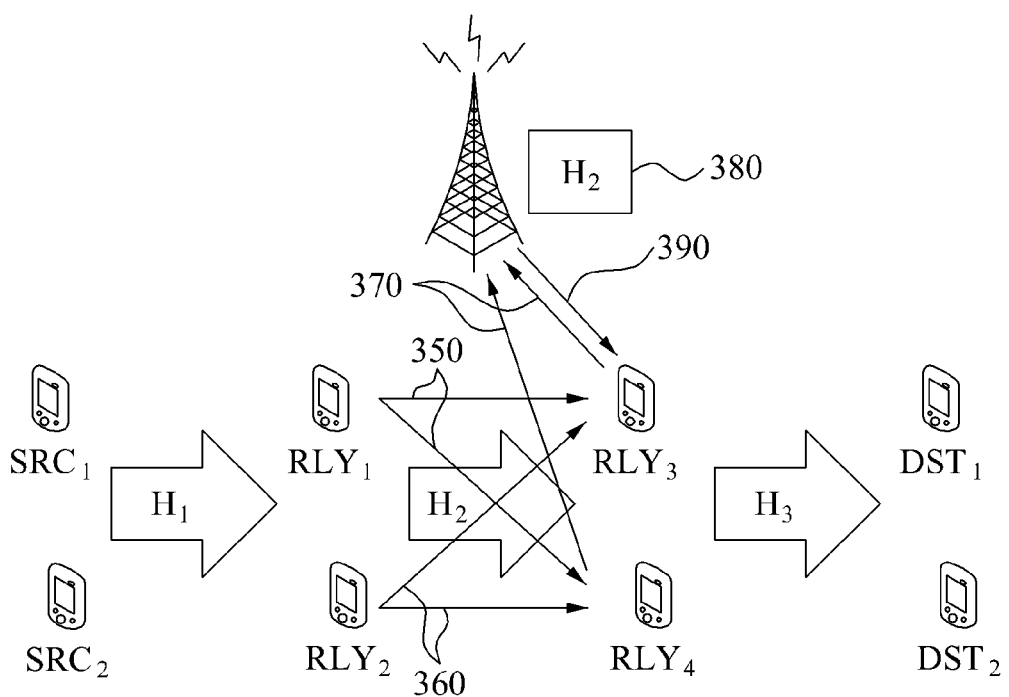

1200

1300

METHOD OF TRANSMITTING AND RECEIVING CHANNEL INFORMATION IN MULTI-HOP NETWORK AND TERMINALS THEREFOR

CROSS-REFERENCE TO RELATED APPLICATION

This application claims the benefit under 35 U.S.C. §119 (a) of Korean Patent Application No. 10-2012-0134451, filed on Nov. 26, 2012, in the Korean Intellectual Property Office, the entire disclosure of which is incorporated herein by reference for all purposes.

BACKGROUND

1. Field

The following description relates to a method of transmitting and receiving channel information in a multi-hop network and terminals therefor.

2. Description of Related Art

Generally, multi-hop transmission is mainly based on an ad-hoc network. However, the ad-hoc network is inferior to a control unit-equipped network with efficient multi-hop cooperation between terminals, for example, a cellular network, in terms of channel information transmission or exchange overhead, channel information inconsistency caused by a time difference between channel estimation and data transmission, and the like.

The control unit-equipped network is more advantageous for multi-hop transmission because the control unit-equipped network allows synchronization between terminals and resource allocation for channel information transmission or exchange. However, with an increase in a number of users within a controllable transmission range, a corresponding increase in channel information transmission or exchange overhead is expected. Such an increase is of particular concern because the channel information transmission or the exchange overhead is of primary concern for efficient multi-hop transmission.

Accordingly, there is a demand for channel information transmission or exchange suitable for multi-hop transmission between multiple users with reduced interference and improved efficiency.

SUMMARY

In accordance with an illustrative configuration, there is provided a method for a multi-hop network. The method includes determining whether channel information is necessary to transmit data processed based on a transmission scheme used in the multi-hop network and outputting a result indicative thereof; configuring channel information based on the transmission scheme, based on the result; and transmitting the configured channel information and the data processed using the configured channel information.

The method also includes transmitting to a receiving terminal a unique pilot of a transmitting terminal to be used to estimate a channel in the multi-hop network.

The method also includes requesting the channel information from a control unit or a receiving terminal to which the data is to be transmitted according to a structure of the multi-hop network.

The transmitting of the configured channel information and the data processed includes pre-coding and transmitting the configured channel information based on the transmission scheme and the data processed when pre-coding is necessary based on the transmission scheme.

The transmitting of the configured channel information and the data processed includes transmitting the channel information and the data using a transmission frame including a pilot section, a channel information section, and a data section. The pilot section includes a unique pilot pattern for a transmitting terminal, the channel information section includes the configured channel information, and the data section includes the data processed.

The method also includes transmitting the configured channel information and unprocessed data when the channel information is determined to be unnecessary to transmit the data based on the transmission scheme.

The channel information configured based on the transmission scheme includes channel information accumulated over multiple hops of the multi-hop network based on the transmission scheme.

The transmission scheme includes at least one of an amplify-and-forward scheme and a decode-and-forward scheme.

In accordance with another illustrative example, there is provided a method for a multi hop network, the method including receiving a unique pilot one of a transmitting terminal to be used to estimate a channel in the multi-hop network; estimating a channel between the transmitting terminal and a receiving terminal using the unique pilot; and receiving a transmission frame including accumulated channel information transmitted from the transmitting terminal through the estimated channel and data including the accumulated channel information.

The method also includes determining whether decoding the data based on the transmission scheme being used in the multi-hop network is necessary and outputting a result indicative thereof; and decoding the data based on the result.

The accumulated channel information is configured based on the transmission scheme being used in the multi-hop network.

The accumulated channel information includes a piece of channel information of a previous transmission channel measured by the transmitting terminal, and channel information of a channel through which the data passes from the transmitting terminal to the receiving terminal.

The method also includes recovering channel information of the channel using the accumulated channel information and the data.

The method also includes receiving a feedback request for channel information from the transmitting terminal or a control unit; and feeding back the recovered channel information in response to the feedback request.

The transmission frame includes a pilot section includes a pilot having a unique pilot pattern for the transmitting terminal, channel information sections including channel information received over the multi-hop network and channel information of a channel estimated using the pilot, and the data section including data to be transmitted over the multi-hop network.

A size and a number of the pilot section, the channel information section, and the data section is determined based on a number of transmitting terminals concurrently transmitting to a same hop in the multi-hop network.

The at least one pilot has an orthogonal pattern for allowing the receiving terminal to distinguish transmitting terminals attempting concurrent transmission to the same hop when the transmitting terminals attempting concurrent transmission to the same hop are present.

In accordance with an illustrative example, there is provided a non-transitory computer-readable medium including a program for instructing a computer to perform the method as described above.

In accordance with an illustrative configuration, there is provided a terminal in a multi-hop network. The terminal includes a determining unit configured to determine whether channel information is necessary to transmit data processed based on a transmission scheme used in the multi-hop network and outputting a result indicative thereof; a configuring unit to configure channel information based on the transmission scheme based on the result; and a transmitting unit configured to transmit the configured channel information and the data processed using the configured channel information.

In accordance with an illustrative configuration, there is provided a terminal in a multi-hop network. The terminal includes a receiving unit configured to receive a unique pilot for at least one transmitting terminal to be used to estimate a channel in the multi-hop network; and an estimating unit configured to estimate a channel between the transmitting terminal and a receiving terminal using the unique pilot for the transmitting terminal. The receiving unit receives a transmission frame including accumulated channel information transmitted from the transmitting terminal through the estimated channel and data including the accumulated channel information.

Other features and aspects will be apparent from the following detailed description, the drawings, and the claims.

BRIEF DESCRIPTION OF THE DRAWINGS

FIG. 2 is a diagram illustrating channel information transmission or exchange in an ad-hoc network.

FIG. 3 is a diagram illustrating channel information transmission or exchange in a cellular network.

Figure 1:
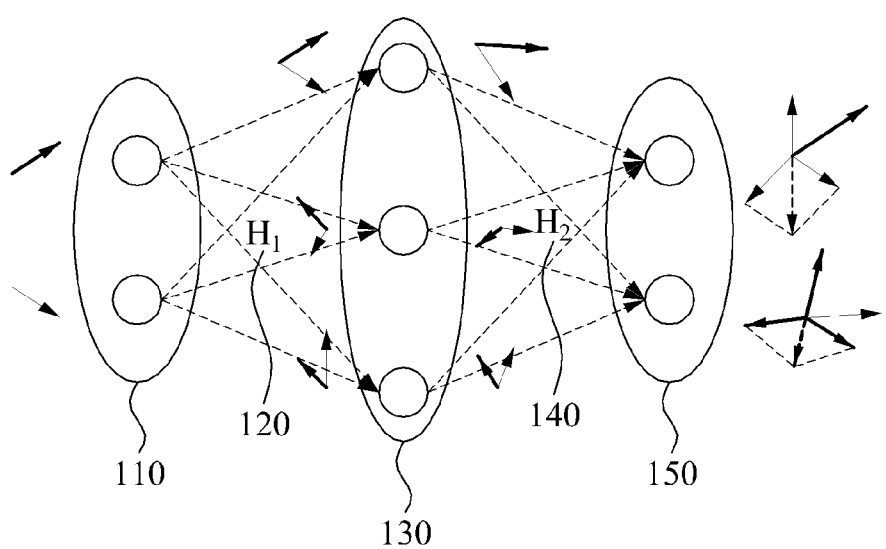
FIG. 1 is a diagram illustrating a multi-hop network, according to an exemplary embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, description of well-known functions and constructions may be omitted for increased clarity and conciseness.

FIG. 1 is a conceptual diagram illustrating a multi-hop network, according to an exemplary embodiment.

Referring to FIG. 1, data may be transmitted from a plurality of transmitting nodes 110 to a plurality of receiving nodes 150 through a plurality of relay nodes 130 in a multi-hop network. Hereinafter, the term "node" used herein may be understood to include a device with a communication function, for example, a mobile terminal, an access point, a router, a relay, a base station, and the like.

Generally, the multi-hop network may involve data transmission from a plurality of cellular system users to a plurality of base stations through a plurality of relays. A channel $H_1$ 120 may be provided between the plurality of transmitting nodes 110 and the plurality of relay nodes 130, and a channel $H_2$ 140 may be provided between the plurality of relay nodes 130 and the plurality of receiving nodes 150.

When signal transmission is concurrently executed between a plurality of pairs of transmitting and receiving nodes, signals or data streams may interfere with one another over multiple hops, so-called inter-stream interference.

To achieve cooperative transmission in a multi-hop network, efficient channel information transmission or exchange is required. Such efficient channel information transmission or exchange is needed because terminals on a signal transmission path need channel information associated with the signal transmission path to adjust a gain through interference neutralization.

Accordingly, an exemplary embodiment proposes a frame structure for a control channel in efficient cooperative multi-hop communication rather than a channel information transmission or exchange scheme for point-to-point communication. A further description of the frame structure is provided with reference to FIG. 6.

Hereinafter, the term "channel information" used herein may be understood to include channel information between nodes and channel information between each node and a control unit.

In the cooperative multi-hop transmission, a transmission scheme for channel information transmission or exchange may be set. Also, channel information transmission or exchange may be made between transmitting nodes or terminals and receiving terminals based on the transmission scheme being set.

Alternatively, each terminal may report, to a base station or a control unit, necessary channel information based on a transmission scheme. A relay may receive the channel information from each terminal or group of terminals, and may transmit the received channel information to the base station or control unit. The base station or control unit may collect channel information, and may transmit or exchange the collected channel information.

However, as a number of terminals increases in an ad-hoc network or a cellular network, overhead, complexity in channel information transmission or exchange, and a time difference between channel estimation and data transmission dramatically. The channel information transmission or exchange in an ad-hoc network and a cellular network is described in further detail with reference to FIGS. 2 and 3.

FIG. 2 is a diagram illustrating channel information transmission or exchange in an ad-hoc network.

Referring to FIG. 2, the illustrated ad-hoc network includes relay nodes $RLY_1$, $RLY_2$, $RLY_3$, and $RLY_4$. In one example, among the relay nodes $RLY_1$, $RLY_2$, $RLY_3$, and $RLY_4$, a third relay node $RLY_3$ and a fourth relay node $RLY_4$ process signals received from a first source node $SRC_1$ and a second source node $SRC_2$ and transmit the signals to a first destination node $DST_1$ and a second destination node $DST_2$. The signals from the first source node $SRC_1$ and the second source node $SRC_2$ arrive at the third relay node $RLY_3$ and the fourth relay node $RLY_4$ through two hops.

To process the signals, the third relay node $RLY_3$ and the fourth relay node $RLY_4$ need channel information from channels $H_1$, $H_2$, and $H_3$ through which the signals pass, even though there is a difference between techniques.

in one illustrative example, when a first relay node $RLY_1$ and a second relay node $RLY_2$ are just responsible to receive and forward the signals, channel information required by the third relay node $RLY_3$ and the fourth relay node $RLY_4$ may include channel information of a compound channel $H_2H_1$ and channel information of the channel $H_3$.

Here, the channel information of the compound channel $H_2H_1$ refers to channel information of channels through which the signals pass from the first source node $SRC_1$ and the second source node $SRC_2$ to the third relay node $RLY_3$ and the fourth relay node $RLY_4$. The channel information of the channel $H_3$ refers to channel information of a channel from the third relay node $RLY_3$ and the fourth relay node $RLY_4$ to the first destination node $DST_1$ and the second destination node $DST_2$.

To obtain the channel information of the compound channel $H_2H_1$, based on the third relay node $RLY_3$, at 210, the first source node $SRC_1$ may transmit a pilot to the first relay node $RLY_1$ and the second relay node $RLY_2$. At 220, the second source node $SRC_2$ transmits a pilot to the first relay node $RLY_1$ and the second relay node $RLY_2$.

At 230, the second relay node $RLY_2$ may transmits to the first relay node $RLY_1$ a channel value for the first source node $SRC_1$ and the second source node $SRC_2$, where the channel value is estimated or measured using the received pilots.

At 240, the first relay node $RLY_1$ estimates the channel $H_1$ using the estimated or measured channel value for the first source node $SRC_1$ and the second source node $SRC_2$. At 250, the first relay node $RLY_1$ transmits channel information of the estimated channel $H_1$ to the third relay node $RLY_3$.

The third relay node $RLY_3$ obtains channel information of the channel $H_2$ through 260, 270, and 280 in the same manner as the foregoing.

At 290, the third relay node $RLY_3$ estimates the compound channel $H_2H_1$ using the channel information of the channels $H_1$ and $H_2$. The first destination node $DST_1$ may obtain channel information of the channel $H_3$ in the same manner as the foregoing.

Subsequently, actual data may be transmitted from the first source node $SRC_1$ and the second source node $SRC_2$ to the first destination node $DST_1$ and the second destination node $DST_2$. Accordingly, multi-hop transmission may be implemented.

However, in the ad-hoc network of FIG. 2, overhead in transmitting messages to transmit or exchange the estimated channel information may dramatically increase, and a delay between channel estimation and message transmission may be prolonged. As a result, the operation of the third relay node $RLY_3$ and the fourth relay node $RLY_4$, as set by a channel estimated result, may be invalid.

FIG. 3 is a diagram illustrating channel information transmission or exchange in a cellular network. Referring to FIG. 3, channel information transmission in a control unit-equipped network such as, for example, a cellular network is described based on a third relay node $RLY_3$.

At 310, a first source node $SRC_1$ transmits a pilot to a first relay node $RLY_1$ and a second relay node $RLY_2$. At 320, a second source node $SRC_2$ transmits a pilot to the first relay node $RLY_1$ and the second relay node $RLY_2$.

At 330, the first relay node $RLY_1$ and the second relay node $RLY_2$ estimate a channel using the pilots transmitted at 310 and 320, and transmit an estimated or measured channel value to the control unit through each channel allocated to the first relay node $RLY_1$ and the second relay node $RLY_2$.

At 340, the control unit estimates a channel $H_1$ using the estimated or measured channel value received from the first relay node $RLY_1$ and the second relay node $RLY_2$.

In one illustrative example, 350, 360, 370, and 380 may be performed in the same manner as 310, 320, 330, and 340, as described above.

In 390, the control unit estimates a channel $H_2$ and may transmits channel information of the estimated channels $H_1$ and $H_2$ or a compound channel $H_2H_1$ to the third relay node $RLY_3$. Subsequently, actual data may be transmitted from the first source node $SRC_1$ and the second source node $SRC_2$ to the first destination node $DST_1$ and the second destination node $DST_2$.

Similar to FIG. 2, in the illustrative example described with respect to cellular network of FIG. 3, overhead in a transmission of messages may increase, and a delay between channel estimation and data transmission may be prolonged.

Accordingly, as described in the following figures, some exemplary embodiments disclose a method of transmitting channel information efficiently and reducing a delay between channel estimation and data transmission to ensure efficient communication in a multi-hop network.

Figure 4:
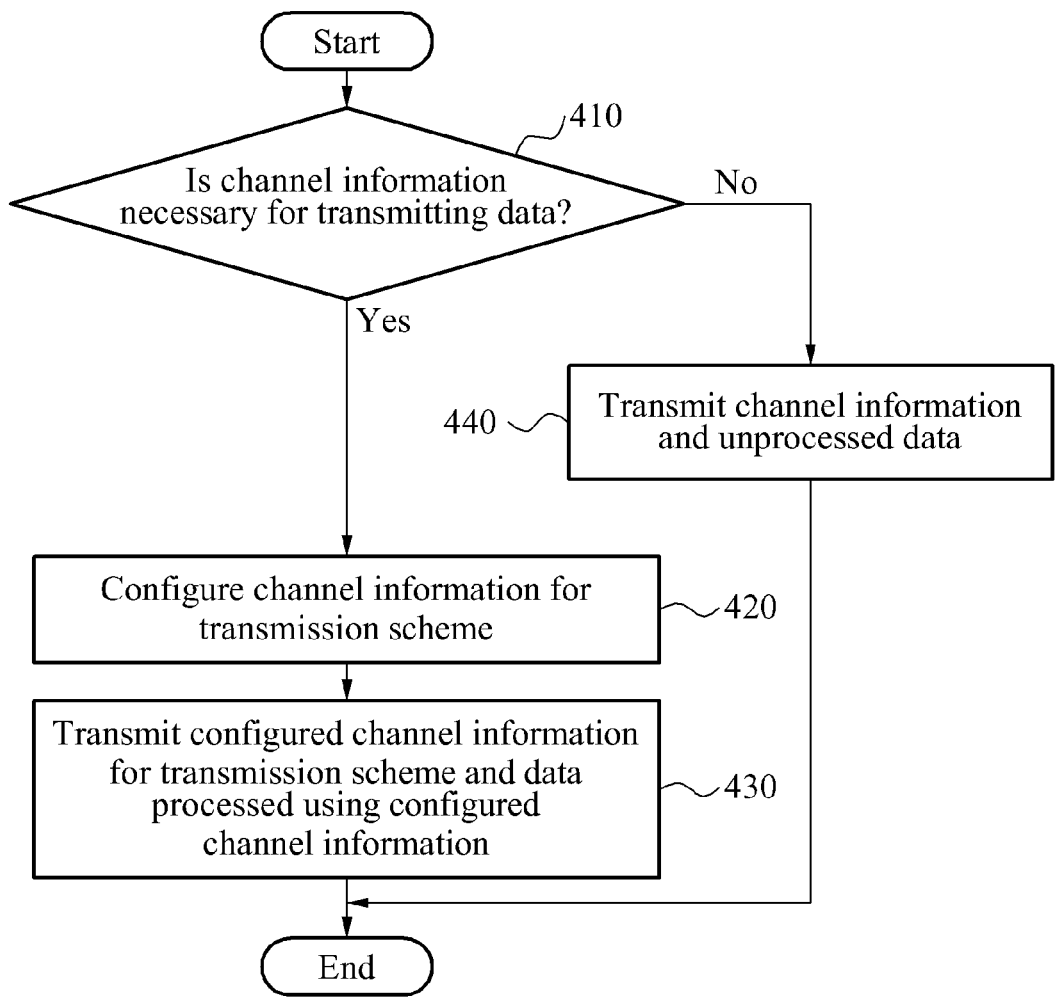
FIG. 4 is a flowchart illustrating a method of transmitting channel information in a multi-hop network, according to an exemplary embodiment.

FIG. 4 is a flowchart illustrating a method of transmitting channel information in a multi-hop network, according to an exemplary embodiment.

Referring to FIG. 4, at 410, a terminal for transmitting channel information, hereinafter referred to as a transmitting terminal, determines whether channel information is necessary to transmit data based on a transmission scheme being used in a multi-hop network. The transmitting terminal may refer to a terminal that transmits channel information and data to a receiving end including, for example, a receiving terminal, a relay, a base station, and the like.

Here, the transmission scheme may include at least one of an amplify-and-forward scheme and a decode-and-forward scheme. When the transmission scheme used in the multi-hop network corresponds to the amplify-and-forward scheme, channel information may be unnecessary because the transmitting terminal simply forwards a signal after amplification. When the transmission scheme used in the multi-hop network corresponds to the decode-and-forward scheme, channel information may be necessary because the transmitting terminal forwards data after decoding is performed.

At 420, when channel information is determined to be necessary to transmit data based on the transmission scheme used in the multi-hop network, the transmitting terminal configures channel information based on the transmission scheme.

At 430, the transmitting terminal transmits, to a receiving terminal, the channel information configured based on the transmission scheme and data processed using the channel information configured based on the transmission scheme. The receiving terminal may include, for example, a terminal to receive channel information and data transmitted from the transmitting terminal, a relay, a base station, and the like.

In this instance, the transmitting terminal transmits channel information and data using a transmission frame for multi-hop transmission. The transmitting terminal may transmit channel information and data using a transmission frame including a pilot section, a channel information section, and a data section. For example, the pilot section includes a pilot having a unique pattern for a transmitting terminal, the channel information section includes channel information configured based on the transmission scheme, and the data section includes data processed using the channel information configured based on the transmission scheme. A further detailed description of the transmission frame is provided with reference to FIG. 6.

In advance of 430 being performed, the transmitting terminal transmits to the receiving terminal a unique pilot for the transmitting terminal to be used to estimate a channel in the multi-hop network.

At 410, when the channel information is determined to be unnecessary to transmit the data based on the transmission scheme, the transmitting terminal may transmit to the receiving terminal the channel information configured based on the transmission scheme and unprocessed data.

Figure 5:
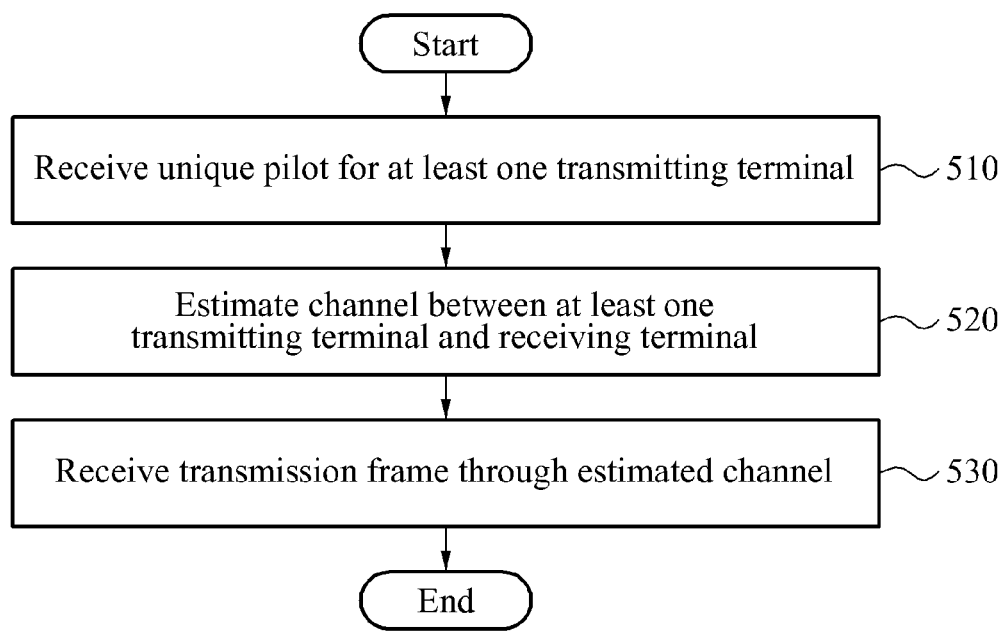
FIG. 5 is a flowchart illustrating a method of receiving channel information in a multi-hop network, according to an exemplary embodiment.

FIG. 5 is a flowchart illustrating a method of receiving channel information in a multi-hop network, according to an exemplary embodiment.

Referring to FIG. 5, at 510, a terminal for receiving channel information, hereinafter referred to as a receiving terminal, receives a unique pilot for at least one transmitting terminal to be used to estimate a channel in a multi-hop network.

At 520, the receiving terminal estimates a channel between the at least one transmitting terminal and the receiving terminal using the received unique pilot for the at least one transmitting terminal.

At 530, the receiving terminal receives a transmission frame through the estimated channel. The transmission frame may include accumulated channel information transmitted from the at least one transmitting terminal and data including the accumulated channel information. In this instance, the accumulated channel information may include at least one piece of channel information from a previous transmission channel measured by the at least one transmitting terminal and channel information from a channel through which the data passes from the at least one transmitting terminal to the receiving terminal. In one example, the accumulated channel information may be configured based on the transmission scheme used in the multi-hop network.

Figure 6:
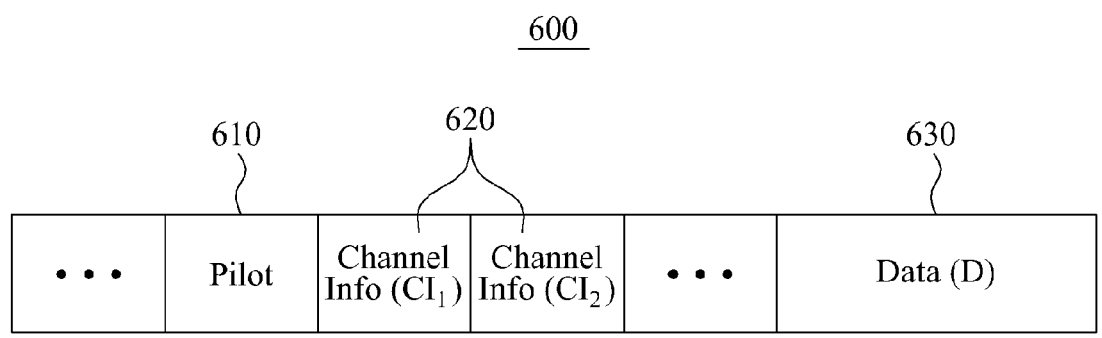
FIG. 6 is a diagram illustrating a structure of a transmission frame for multi-hop transmission in a multi-hop network, according to an exemplary embodiment.

FIG. 6 is a diagram illustrating a structure of a transmission frame 600 for multi-hop transmission in a multi-hop network, according to an exemplary embodiment.

Referring to FIG. 6, the transmission frame 600 used for multi-hop transmission in a multi-hop network may include, in part, a pilot section (field) 610, channel information sections $CI_1$ and $CI_2$ 620, and a data section D 630.

In one configuration, the pilot section 610 is used to estimate a channel, and includes at least one pilot having a unique pattern or a unique identifying pattern for at least one transmitting terminal. When transmitting terminals attempting concurrent transmission to the same hop in the multi-hop network are present, the at least one pilot included in the pilot section 610 has an orthogonal pattern for allowing the receiving terminal to distinguish the transmitting terminals attempting concurrent transmission to the same hop.

The channel information sections $CI_1$ and $CI_2$ 620 may include channel information received over the multi-hop network and channel information of at least one channel estimated using the at least one pilot. In one example, a number of the channel information sections $CI_1$ and $CI_2$ 620 may be greater than or equal to a minimum number of transmitting terminals concurrently transmitting to the same hop, among terminals using the same transmission scheme.

The channel information transmitted through the channel information sections $CI_1$ and $CI_2$ 620 may include channel information that is recovered by the transmitting terminal based on the transmission scheme. For example, the channel information transmitted through the channel information sections $CI_1$ and $CI_2$ 620 includes channel information measured or estimated by the receiving terminal using the pilot, channel information received by the receiving terminal using the transmission frame, and channel information that may be processed and produced using the channel information measured or estimated by the receiving terminal and the channel information received using the transmission frame.

The data section D 630 may be used to transmit actual data, and may include data to be transmitted over the multi-hop network. The data section D 630 may include data decoded and un-decoded based on the transmission scheme.

Here, a size and a number of the pilot section 610, the channel information sections $CI_1$ and $CI_2$ 620, and the data section D 630 may be determined based on a number of transmitting terminals concurrently transmitting to the same hop in the multi-hop network.

For example, in a case in which two flows of data are transmitted through multi-hop cooperative transmission using a transmission frame, when two transmitting terminals attempt to concurrently transmit data to the same hop, a pilot section of the transmission frame has an orthogonal pilot pattern enabling or allowing the receiving terminals to distinguish the transmitting terminals. Accordingly, the receiving terminals may enable concurrent channel estimation.

In one illustrative configuration, the transmitting terminals analyzes channel information of channels between the receiving terminals and the transmitting terminals using the channel information sections $CI_1$ and $CI_2$ 620 allocated to the transmitting terminals, estimate the channels, and transmit channel information of the estimated channels to the receiving terminal along with data.

The transmitting terminals may transmit actual data using the data section D 630. In this example, the data transmitted through the data section D 630 is transmitted to a next receiving terminal, along with the pilot and the channel information included in the transmission frame. Accordingly, the channel information inconsistency is minimized between estimated channels and accumulated channels, caused by a prolonged delay between channel estimation and data transmission.

According to an exemplary embodiment, channel information inconsistency caused by a delay between channel estimation and data transmission may be reduced by concurrently transmitting estimated channel information and data using one transmission frame.

Further, when channel decoding is unnecessary in multi-hop transmission in a transmission scheme, channel information accumulated over multiple hops and data passed through multiple hops may be transmitted to a terminal absent or without decoding. Accordingly, this transmission scheme minimizes the inconsistency between accumulated channel information and channel information of channels through which data passes for a terminal requiring accumulated channel information.

Hereinafter, an example of operation using the transmission frame of FIG. 6 is described with reference to FIG. 7.

Figure 7:
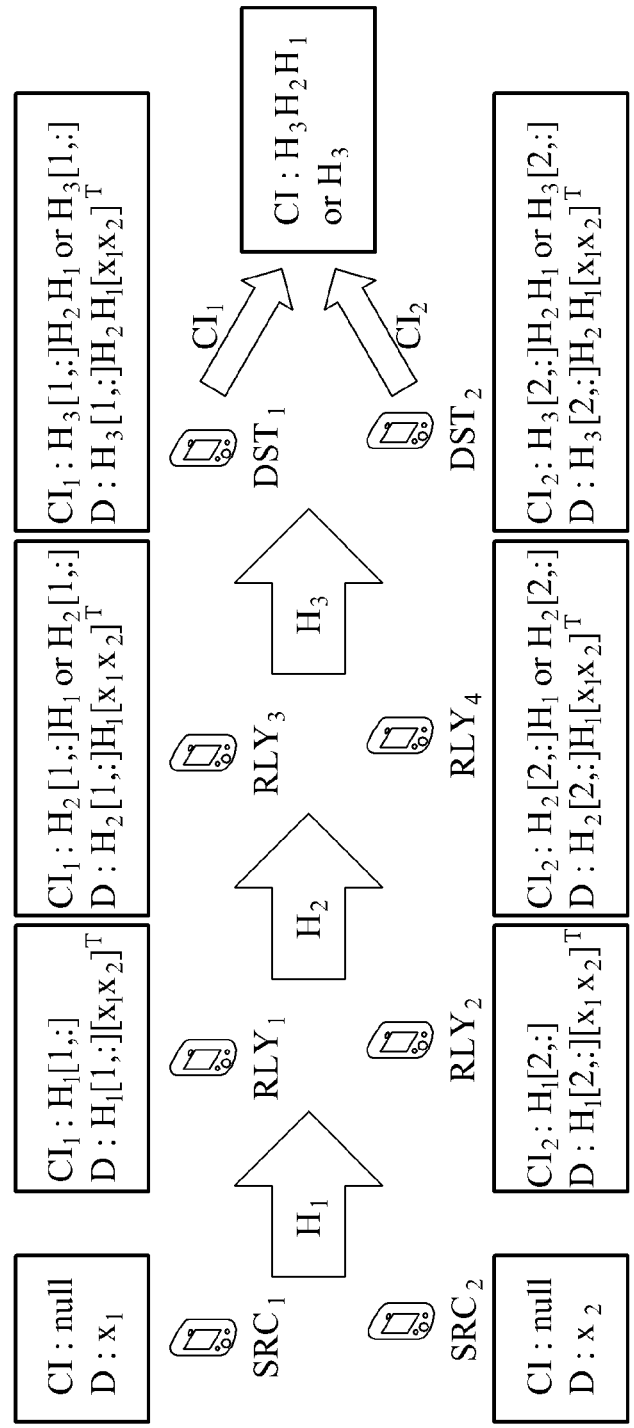
FIG. 7 is a diagram illustrating channel information and data being transmitted to each terminal using a transmission frame in a multi-hop network, according to an exemplary embodiment.

FIG. 7 is a diagram illustrating channel information and data being transmitted to each terminal using a transmission frame in a multi-hop network, according to an exemplary embodiment.

In $H_2[1, :][X_1, X_2]^T$, H denotes a channel matrix, and $H[a,:]$ denotes an $a^{th}$ row vector. A column vector may be represented in the same manner. Also, $[X_1, X_2]$ denotes an augmented matrix obtained through a combination of vectors or matrices $X_1$ and $X_2$.

Referring to FIG. 7, in an example in which two flows of data are transmitted concurrently in a multi-hop network, when a transmission scheme used in the multi-hop network corresponds to an amplify-and-forward scheme, each terminal may amplify and forward data to a next hop absent decoding.

Data $x_1$ and $x_2$ generated by a first source node $SRC_1$ and a second source node $SRC_2$ are transmitted to a first destination node $DST_1$ and a second destination node $DST_2$, respectively.

At the time of transmission from the first source node $SRC_1$ and the second source node $SRC_2$, channel information, for example, $CI_1$ and $CI_2$ are absent in a transmission frame. Accordingly, each channel information section is set to NULL, and only data is transmitted through a data section.

The transmission frame is transmitted to a first relay node $RLY_1$ and a second relay node $RLY_2$.

The first relay mode $RLY_1$ and the second relay node $RLY_2$ estimate a channel from the first source node $SRC_1$ and the second source node $SRC_2$ to the first relay node $RLY_1$ and the second relay node $RLY_2$, through a pilot section of the transmission frame received from the first source node $SRC_1$ and the second source node $SRC_2$. Also, a transmission frame is produced or generated for a subsequent transmission.

The channel information of the channel $H_1$, from the first source node $SRC_1$ and the second source node $SRC_2$ to the first relay node $RLY_1$ and the second relay node $RLY_2$, estimated by the first relay node $RLY_1$ and the second relay node $RLY_2$ is included in a channel information section of the transmission frame allocated to each of the first relay node $RLY_1$ and the second relay node $RLY_2$. The data transmitted, from the first source node $SRC_1$ and the second source node $SRC_2$ to the first relay node $RLY_1$ and the second relay node $RLY_2$ through the channel $H_1$, is included in the data section of the transmission frame, respectively. Accordingly, the channel information estimated by the first relay node $RLY_1$ and the second relay node $RLY_2$ may be transmitted concurrently along with the data.

Through the same process detailed in the foregoing, the data may be transmitted to the first destination node $DST_1$ and the second destination node $DST_2$ through a third relay node $RLY_3$ and a fourth relay node $RLY_4$.

In this exemplary embodiment, when each relay node amplifies and forwards data absent decoding, the first destination node $DST_1$ and the second destination node $DST_2$ may attempt to extract desired information using the channel information and the data received from each relay node. This process may be also applied when each relay node operates based on a predetermined transmission scheme. In this case, a channel information value may be different based on a desired type of channel information for each relay node.

As described in the foregoing, a time difference between channel estimation and data transmission occurring during wireless transmission in a multi-hop network may be overcome by concurrently transmitting channel information and data. Particularly, in a multi-hop transmission, a terminal may transmit data only after amplifying the data, absent decoding, based on a transmission scheme. Also, the terminal, may transmit accumulated channel information along with the data.

As a result, a time difference between channel estimation and data transmission may be further reduced. Further, when channel information and data is concurrently transmitted, an unlimited amount of channel information and data may be stored in a system memory of a receiver or a transmitter. Also, a sufficient period of time may be ensured for a subsequent transmission. Accordingly, an additional gain of time diversity may be obtained.

Figure 8:
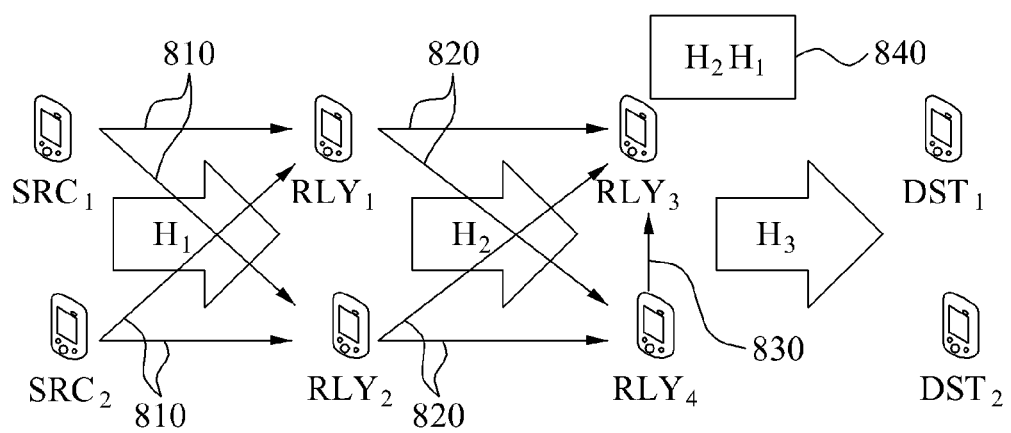
FIG. 8 is a diagram illustrating transmission of channel information and data in an ad-hoc network using a method of transmitting and receiving channel information in a multi-hop network, according to an exemplary embodiment.

FIG. 8 is a diagram illustrating transmission of channel information and data in an ad-hoc network using a method of transmitting and receiving channel information in a multi-hop network according to an exemplary embodiment.

Referring to FIG. 8, when two flows of data are transmitted concurrently using a transmission frame in an ad-hoc network and channel information of a compound channel $H_2H_1$ is requested by a third relay node $RLY_3$, message transmission or exchange is executed between terminals.

At 810, a first source node $SRC_1$ and a second source node $SRC_2$ transmit a transmission frame to a first relay node $RLY_1$ and a second relay node $RLY_2$.

At 820, the first relay node $RLY_1$ and the second relay node $RLY_2$ generate a transmission frame based on information included in the transmission frame received from the first relay node $RLY_1$ and the second relay node $RLY_2$. The first relay node $RLY_1$ and the second relay node $RLY_2$ also transmit the generated transmission frame to a third relay node $RLY_3$ and a fourth relay node $RLY_4$.

At 830, the fourth relay node $RLY_4$ transmits channel information for the fourth relay node $RLY_4$ to the third relay node $RLY_3$.

At 840, the third relay node $RLY_3$ produces or generates channel information of the compound channel $H_2H_1$ requested by the third relay node $RLY_3$.

Figure 9:
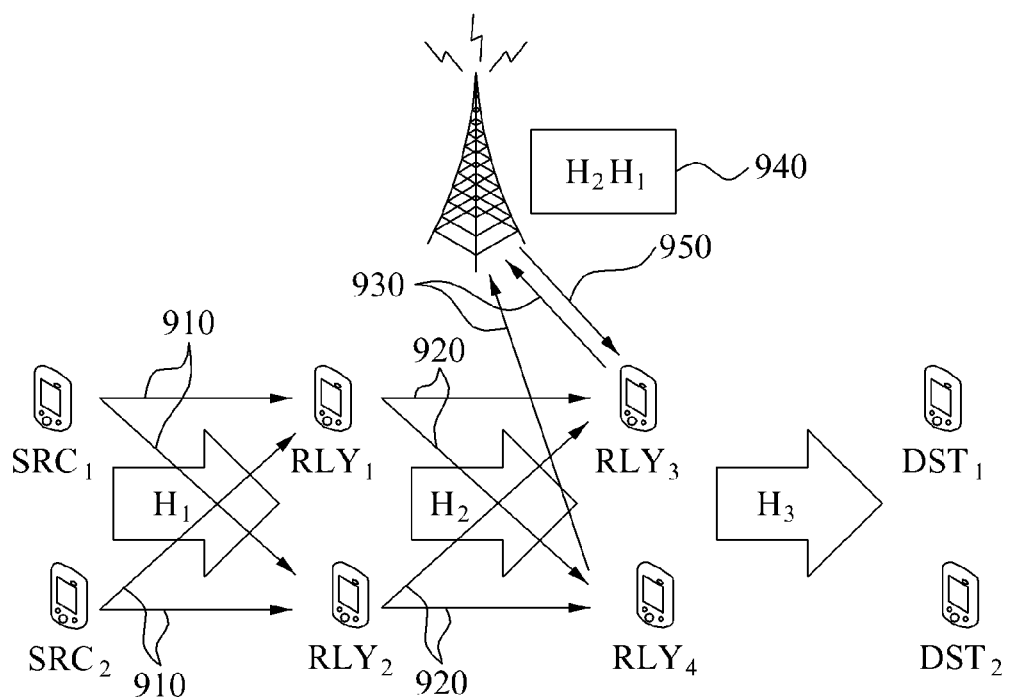
FIG. 9 is a diagram illustrating transmission of channel information and data in a cellular network using a method of transmitting and receiving channel information in a multi-hop network, according to an exemplary embodiment.

FIG. 9 is a diagram illustrating transmission of channel information and data in a cellular network using a method of transmitting and receiving channel information in a multi-hop network, according to an exemplary embodiment.

When two flows of data are transmitted concurrently in a cellular network and channel information of a compound channel $H_2H_1$ is requested by a third relay node $RLY_3$, at 910, a first source node $SRC_1$ and a second source node $SRC_2$ transmit data to a first relay node $RLY_1$ and a second relay node $RLY_2$.

At 920, the first relay node $RLY_1$ and the second relay node $RLY_2$ forward the data to a third relay node $RLY_3$ and a fourth relay node $RLY_4$.

At 930, the third relay node $RLY_3$ and the fourth relay node $RLY_4$ transmit channel information of the third relay node $RLY_3$ and the fourth relay node $RLY_4$ to a control unit.

At 940, the control unit generates channel information of the compound channel $H_2H_1$ using the channel information and the data received from each transmitting terminal. At 950, the control unit transmits the generated channel information of the compound channel $H_2H_1$ to the third relay node $RLY_3$.

According to an exemplary embodiment, based on a transmission scheme by which channel information transmission or exchange is executed between terminals or between each terminal and a control unit to obtain channel information, only a terminal requiring channel information may request channel information and may receive channel information in response to the request. As a result, such transmission scheme would reduce the channel information transmission or exchange overhead.

Figure 10:
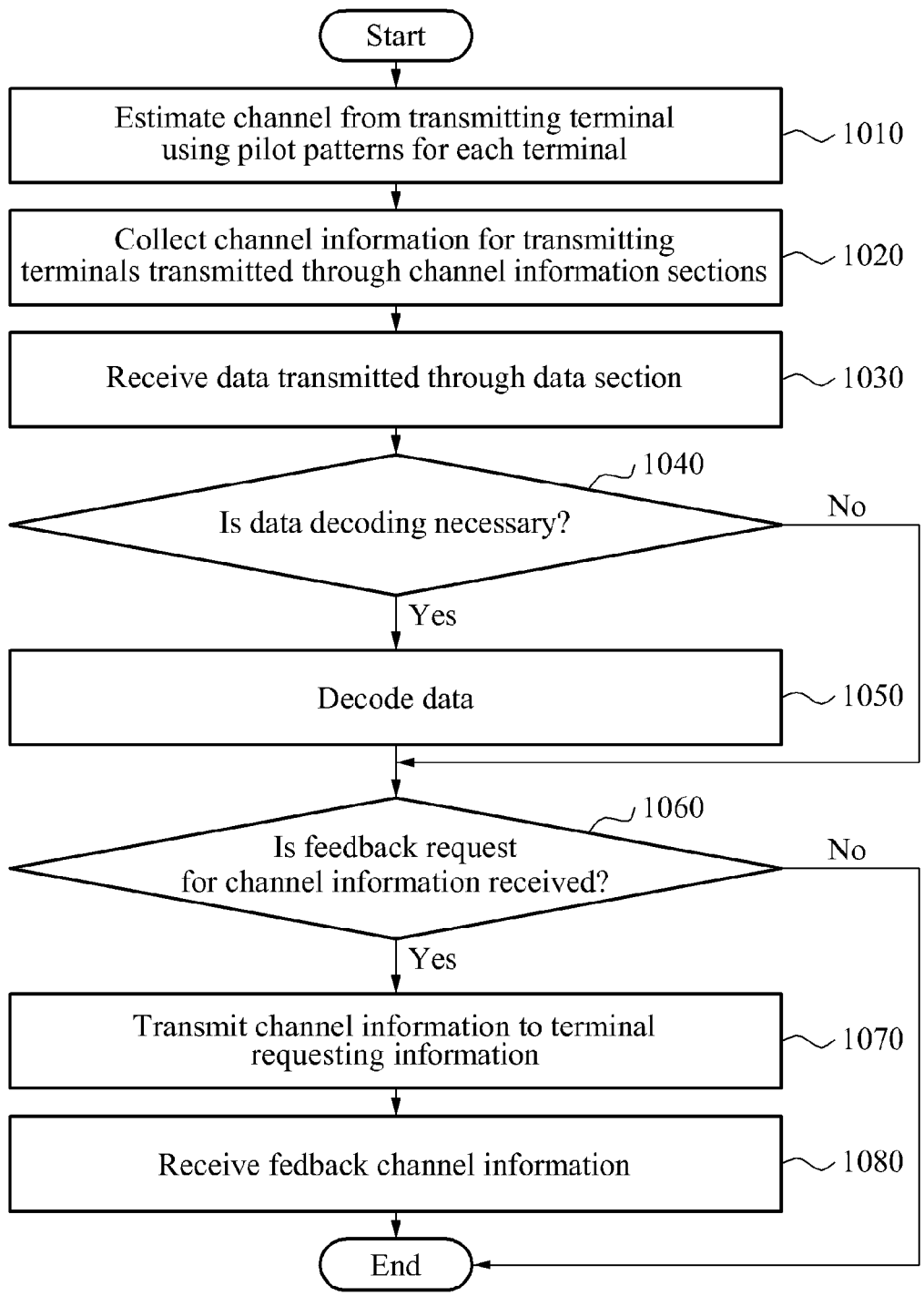
FIG. 10 is a flowchart illustrating a method of receiving channel information in a multi-hop network, according to another exemplary embodiment.

FIG. 10 is a flowchart illustrating a method of receiving channel information in a multi-hop network, according to another exemplary embodiment.

Referring to FIG. 10, at 1010, a receiving terminal estimates a channel between at least one transmitting terminal and the receiving terminal using a unique pilot for the at least one transmitting terminal included in a pilot section of a transmission frame, which is transmitted from the at least one transmitting terminal.

At 1020, the receiving terminal receives accumulated channel information for the at least one transmitting terminal through a channel information section of the transmission frame through the estimated channel. The accumulated channel information may differ based on channel information transmitted from the transmitting terminal. For example, the accumulated channel information may include channel information of a previous transmission channel measured or estimated by the at least one transmitting terminal. The accumulated channel information may also include channel information through which data passes from the at least one transmitting terminal to the receiving terminal.

The receiving terminal recovers channel information of the channel between the at least one transmitting terminal and the receiving terminal. In the alternative, the receiving terminal recovers channel information through which a signal received from the transmitting terminal passes. In either instance, the receiving terminal recovers the channel information using the accumulated channel information and the data, when needed.

At 1030, the receiving terminal receives data through a data section of the transmission frame.

At 1040, the receiving terminal determines whether data decoding is necessary, based on a transmission scheme used in the multi-hop network. When data decoding is determined to be necessary, at 1050, the receiving terminal decodes the received information, for example, the data and the channel information. When data decoding is determined to be unnecessary at 1040, the receiving terminal may fail to decode the corresponding information.

At 1060, the receiving terminal determines whether the receiving terminal receives a feedback request for the channel information of the channel from the at least one transmitting terminal or the control unit to the receiving terminal. When the receiving terminal receives the feedback request, at 1070, the receiving terminal feeds back the requested channel information, for example, the recovered channel information, to the transmitting terminal or the control unit in response to the request.

At 1080, the receiving terminal receives channel information returning in response to the feedback of the channel information.

When the receiving terminal fails to receive the feedback request at 1060, the receiving terminal terminates the process.

In a case in which all the terminals participate in the feedback of the channel information, an amount of feedback of channel information may differ based on a number of terminals participating in a transmission in the multi-hop network. Rather than all the terminals participating in the transmission, only some terminals may need channel information to perform a relaying operation based on the transmission scheme.

When all the terminals participating in the transmission do not need to feed back the channel information, the channel information may be transmitted to a next receiving terminal along with the data through the transmission frame absent feedback. This method may reduce the amount of feedback in the multi-hop network.

Figure 11:
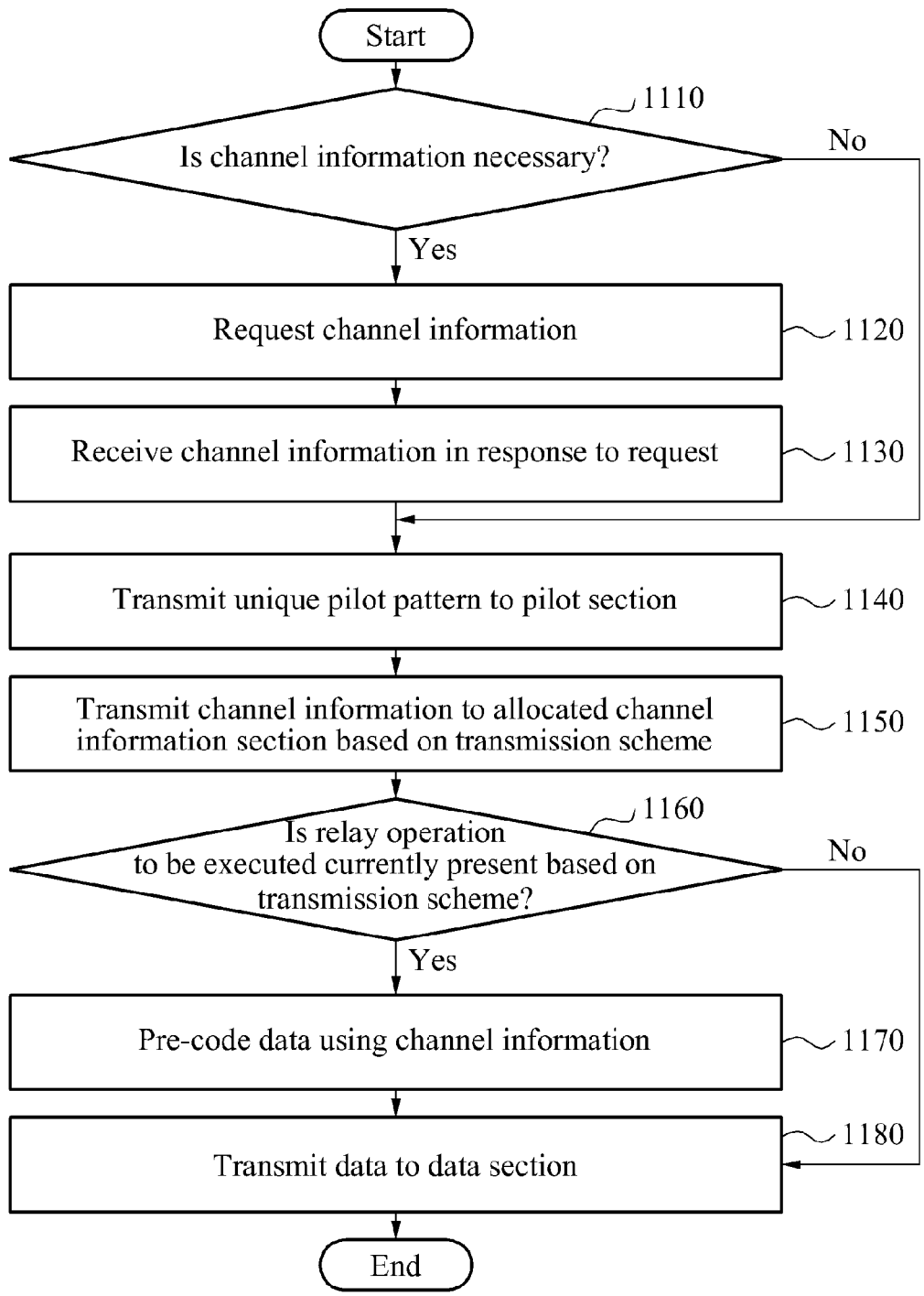
FIG. 11 is a flowchart illustrating a method of transmitting channel information in a multi-hop network, according to another exemplary embodiment.

FIG. 11 is a flowchart illustrating a method of transmitting channel information in a multi-hop network, according to another exemplary embodiment.

A transmission sequence may be different based on a role of a transmitting terminal playing in a transmission scheme.

Referring to FIG. 11, at 1110, the transmitting terminal determines whether channel information is necessary to transmit data based on a transmission scheme used in a multi-hop network. For example, in a case in which the transmitting terminal processes and transmits data using channel information, channel information may be necessary.

When channel information is determined to be necessary, at 1120, the transmitting terminal requests channel information. The transmitting terminal requests channel information from a control unit or a terminal requiring channel information according to a structure of the multi-hop network, for example, a receiving terminal that intends to transmit data.

In one illustrative example, when the multi-hop network corresponds to a cellular network equipped with a control unit, the transmitting terminal requests channel information from the control unit. When the multi-hop network corresponds to an ad-hoc network, the transmitting terminal requests channel information from a terminal requiring channel information to transmit data, for example, a receiving terminal.

When channel information is determined to be unnecessary, at 1149, the transmitting terminal may start a transmission sequence.

At 1130, the transmitting terminal receives the channel information in response to the request.

At 1140, the transmitting terminal places a pilot having a unique pattern for the transmitting terminal in a pilot section of a transmission frame.

At 1150, the transmitting terminal configures channel information stored in the transmitting terminal based on the transmission scheme, and places the configured channel information in a channel information section of the transmission frame allocated to the transmitting terminal.

At 1160, the transmitting terminal determines whether a relaying operation to be executed based on the transmission scheme is present. Pre-coding may be necessary for executing a relaying operation.

When pre-coding is determined to be necessary to execute a relaying operation based on the transmission scheme, at 1170, the transmitting terminal pre-codes the channel information based on the transmission scheme and data processed using the configured channel information.

At 1180, the transmitting terminal places the pre-coded data in a data section of the transmission frame, and transmits the transmission frame. In one example, the channel information configured based on the transmission scheme includes channel information accumulated through multiple hops in the multi-hop network.

When a relaying operation to be currently executed based on the transmission scheme is determined to be absent in 1160, at 1180, the transmitting terminal transmits the data to the receiving terminal directly absent pre-coding.

When the transmitting terminal only plays a role in transmitting data absent a special operation, the transmitting terminal transmits a pilot having a unique pattern, channel information, and unprocessed data.

Figure 12:
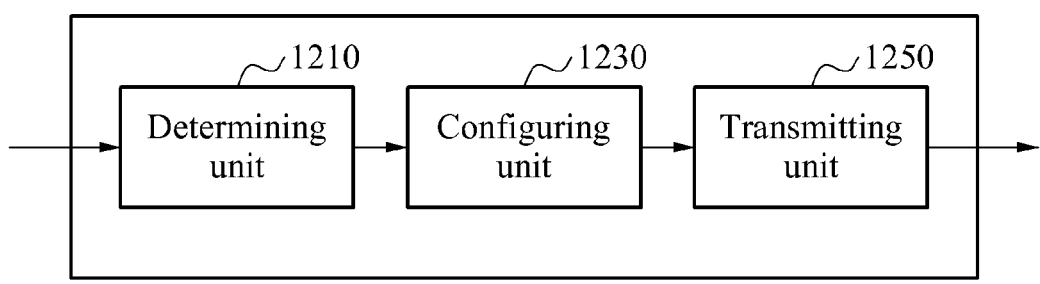
FIG. 12 is a block diagram illustrating a terminal for transmitting channel information in a multi-hop network, according to an exemplary embodiment.

FIG. 12 is a block diagram illustrating a terminal 1200 for transmitting channel information in a multi-hop network, according to an exemplary embodiment.

Referring to FIG. 12, the terminal 1200 to transmit channel information in the multi-hop network includes a determining unit 1210, a configuring unit 1230, and a transmitting unit 1250.

The determining unit 1210 determines whether channel information is required or necessary to transmit data based on a transmission scheme being used in the multi-hop network and output a result indicative thereof.

Based on the result from the determining unit 1210, the configuring unit 1230 configures channel information based on the transmission scheme.

The transmitting unit 1250 transmits the channel information configured based on the transmission scheme and the data processed using the configured channel information through a transmission frame.

Figure 13:
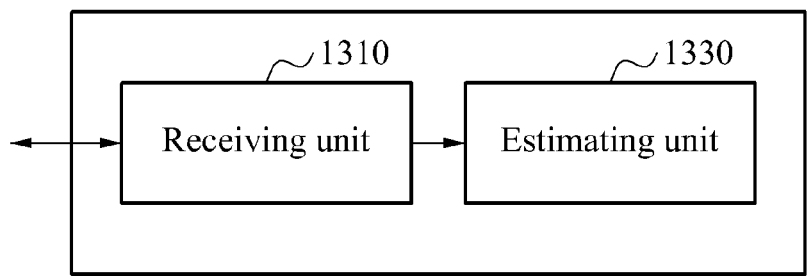
FIG. 13 is a block diagram illustrating a terminal for receiving channel information in a multi-hop network, according to an exemplary embodiment.

FIG. 13 is a block diagram illustrating a terminal 1300 configured to receive channel information in a multi-hop network, according to an exemplary embodiment.

Referring to FIG. 13, the terminal 1300 receiving channel information in the multi-hop network includes a receiving unit 1310 and an estimating unit 1330.

The receiving unit 1310 receives a unique pilot for at least one transmitting terminal to be used to estimate a channel in the multi-hop network.

The estimating unit 1330 estimates a channel between the at least one transmitting terminal and the receiving terminal using the received unique pilot for the at least one transmitting terminal.

In this instance, the receiving unit 1310 receives accumulated channel information transmitted from the at least one transmitting terminal through the estimated channel and data including the accumulated channel information.

The units described herein may be implemented using hardware components. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The processes described with respect to FIGS. 4, 5, 10, and 11 may be configured using software. The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The computer readable recording medium may include any data storage device that can store data which can be thereafter read by a computer system or processing device. Examples of the computer readable recording medium include read-only memory (ROM), random-access memory (RAM), CD-ROMs, magnetic tapes, floppy discs, optical data storage devices. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method for a communication device in a multi-hop network, the method comprising:
receiving a transmission frame, the transmission frame comprising a pilot section, a plurality of channel sections, and a data section, wherein:
through the pilot section, unique pilots transmitted from source devices attempting concurrent transmission are simultaneously received, each of the unique pilots having an orthogonal pattern,
through each of the plurality of channel sections, accumulated channel information transmitted from corresponding source device is received, and
through the data section, data transmitted from the source devices are simultaneously received;
estimating a piece of channel information of a current hop, based on the unique pilots received through the pilot section;

obtaining entire channel information of at least one previous hop, based on the accumulated channel information received through the plurality of channel sections;

transmitting, to a next hop, a unique pilot for the communication device;

transmitting, to the next hop, accumulated channel information comprising the piece of channel information of the current hop and the entire channel information of the at least one previous hop; and transmitting, to the next hop, data prepared based on the data section.

2. The method of claim 1, wherein the accumulated channel information is configured based on a type of transmission scheme used in the multi-hop network.

3. The method of claim 1, further comprising:

recovering channel information of the multi-hop network, based on the piece of the channel information of the current hop and the entire channel information of the at least one previous hop.

4. The method of claim 3, further comprising:

receiving a feedback request for channel information from the source device or a control unit; and feeding back the recovered channel information in response to the feedback request.

5. The method of claim 1, wherein a size and a number of the pilot section, the plurality of the channel information sections, and the data section is determined based on a number of source devices concurrently transmitting to a same hop in the multi-hop network.

6. A non-transitory computer-readable medium comprising a program for instructing a computer to perform the method of claim 1.

7. The method of claim 1, further comprising: determining whether decoding of the data is necessary, based on a type of transmission scheme used in the multi-hop network; and decoding the data based on the determination result.

8. A communication device in a multi-hop network, the communication device comprising:

a communication module configured to receive a transmission frame, the transmission frame comprising a pilot section, a plurality of channel sections, and a data section, wherein:

through the pilot section, unique pilots transmitted from source devices attempting concurrent transmission are simultaneously received, each of the unique pilots having an orthogonal pattern, through each of the plurality of channel sections, accumulated channel information transmitted from corresponding source device is received, and through the data section, data transmitted from the source devices are simultaneously received; and a processor configured to estimate a piece of channel information of a current hop based on the unique pilots received through the pilot section, and obtain entire channel information of at least one previous hop based on the accumulated channel information received through the plurality of channel sections, wherein the communication module is further configured to:

transmit, to a next hop, a unique pilot for the communication device, transmit, to the next hop, accumulated channel information comprising the piece of channel information of the current hop and the entire channel information of the at least one previous hop, and transmit, to the next hop, data prepared based on the data section.

9. A communication device in a multi-hop network, the communication device comprising:

a communication module configured to receive a transmission frame, the transmission frame comprising a pilot section, a plurality of channel sections, and a data section, wherein:

through the pilot section, unique pilots transmitted from source devices attempting concurrent transmission are simultaneously received, each of the unique pilots having an orthogonal pattern, through each of the plurality of channel sections, accumulated channel information transmitted from corresponding source device is received, and through the data section, data transmitted from the source devices are simultaneously received; and a processor configured to estimate a piece of channel information of a current hop based on the unique pilots received through the pilot section, and obtain entire channel information of at least one previous hop based on the accumulated channel information received through the plurality of channel sections, wherein the processor is further configured to decode the data section, based on the piece of channel information of the current hop and the entire channel information of the at least one previous hop.

10. A method for a communication device in a multi-hop network, the method comprising:

receiving a transmission frame, the transmission frame comprising a pilot section, a plurality of channel sections, and a data section, wherein:

through the pilot section, unique pilots transmitted from source devices attempting concurrent transmission are simultaneously received, each of the unique pilots having an orthogonal pattern, through each of the plurality of channel sections, accumulated channel information transmitted from corresponding source device is received, and through the data section, data transmitted from the source devices are simultaneously received;

estimating a piece of channel information of a current hop, based on the unique pilots received through the pilot section;

obtaining entire channel information of at least one previous hop, based on the accumulated channel information received through the plurality of channel sections; and decoding the data section, based on the piece of channel information of the current hop and the entire channel information of the at least one previous hop.

* * * * *